UNITED STATES PATENT OFFICE.

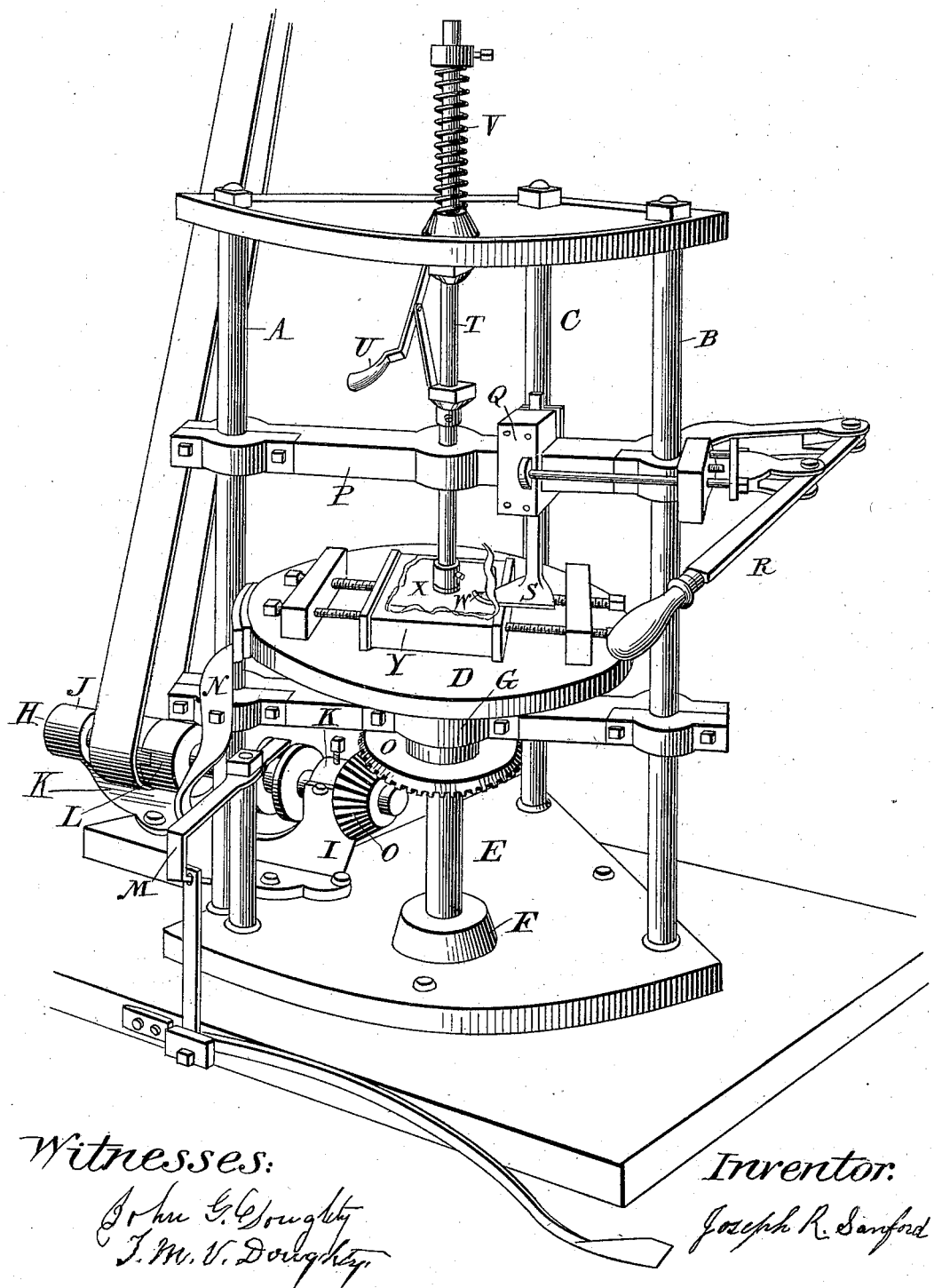

JOSEPH R. SANFORD, OF WINCHESTER, CONNECTICUT.

MACHINE FOR TRIMMING EDGES OF METAL PLATES.

SPECIFICATION forming part of Letters Patent No. 535,121, dated March 5, 1895.

Application filed June 20, 1894. Serial No. 515,209. (No model.)

*To all whom it may concern:*

Be it known that I, JOSEPH R. SANFORD, a citizen of the United States, residing at Winchester, in the county of Litchfield and State of Connecticut, have invented a new and useful machine for trimming to a level with the face of the die the edges of casket-plates, hollow ware, or other articles of manufacture of whatever shape, size, or form that are raised or formed in a die and require trimming to a level edge, of which the following is a specification.

I attain this by the mechanism illustrated in the accompanying drawing, which is a vertical view in perspective of the entire machine.

The machine is upright in form and described as follows: The top and base are alike in size and in form a quadrant the arc being in front. The top and base are connected by three upright posts A. B. C. turned to a shoulder and bolted. The table D. is circular with a diameter equal to the length of a radius of the quadrant. It is fitted with clamps or other device for holding the dies and is revolved by an upright shaft E. running at the bottom in the bearing F. which bearing is placed at the center of a line drawn between the posts A. and B. and passing through another bearing G. formed by a cross bar between and connecting posts A. and B. A shaft H. rotates at right angles with the upright shaft E. having a suitable support I with bearings at J. and K. and driven by a clutch L. which is controlled by the lever M. the table D being controlled by the brake N. This shaft communicates motion to the table by means of the bevel gears O. O. Keyed to upright and horizontal shafts E. and H. a vertically adjustable knife bar P. placed between and connecting posts A. and B. is fitted with the tool holder Q. which has a sliding motion on the bar controlled by the lever R. The knife S. is adjustable in the tool holder Q the cutting edge of the knife being rolled or turned up slightly at the inner point W. A platen bar T. passing through the top casting and knife bar, in line with the upright shaft E. is controlled by the lever U and spring V. This bar holds, when down, the trimming platen X and the work firmly in the die, and when thrown up by the spring V. raises the trimming platen so as to allow the work to be taken out and replaced. The dies to be used are each fitted with a trimming platen which is secured to the lower end of the platen bar T as shown in the drawing.

In trimming the articles the same die is used in combination with the machine specified that is used to raise or form the articles.

To describe the working of the combined parts more fully, I will take for example a casket plate, which has been raised or formed in the die and an uneven flange of metal is left above the face of the die which requires trimming to a true edge, level with the face of the die, so that when the plate is taken from the die and placed right side up it shall have an even, true base, to rest upon. The die Y., the trimming platen X and the knife S. are properly adjusted and secured in position, the plate is replaced in the die, the trimming platen is thrown down and held by the lever U., the table is put in motion and the knife is thrown into contact with the flange of metal by the action of lever R. The turned up point W of the knife S. first strikes the flange and cuts through it thus causing the scrap to come away freely instead of forming in a ring about the platen bar as would occur if the knife had a straight edge. The table is stopped at one revolution, the knife thrown back, the trimming platen raised and the trimmed plate taken out.

To the best of my knowledge no machine has been made or used, prior to my invention, for trimming to a level with the face of the die, the edges of casket plates, hollowware, &c. The idea upon which my invention is based, is to bring the flange of the plate that projects above the face of the die into contact with a sharp edged tool and move it against the same by the application of power.

What I therefore claim as my invention, and desire to secure by Letters Patent, is—

The combination of the revolving table D. on which the die to be used is secured, the trimming tool S. made with the inner point W turned up and rigidly set in a tool-holder Q. and working on an adjustable cross-bar P. by the action of lever R. the platen bar T lowered by the lever U. and raised by the spring V. all substantially as set forth and described in the above specification.

JOSEPH R. SANFORD.

Witnesses:
SOPHIA A. DOUGHTY,
JOHN G. DOUGHTY.